United States Patent
Lathrop et al.

(10) Patent No.: US 9,853,494 B2
(45) Date of Patent: Dec. 26, 2017

(54) ACTIVE ENGINE COOL DOWN TIME DELAY FOR AUTOMATIC TRANSFER SWITCH CONTROLLERS

(71) Applicant: Eaton Corporation, Cleveland, OH (US)

(72) Inventors: Todd M. Lathrop, Oakdale, PA (US); David G. Loucks, Coraopolis, PA (US); Bert Popovich, Carnegie, PA (US)

(73) Assignee: Eaton Corporation, Cleveland, OH (US)

( * ) Notice: Subject to any disclaimer, the term of this patent is extended or adjusted under 35 U.S.C. 154(b) by 702 days.

(21) Appl. No.: 14/108,546

(22) Filed: Dec. 17, 2013

(65) Prior Publication Data
US 2015/0171662 A1    Jun. 18, 2015

(51) Int. Cl.
*H02J 9/06* (2006.01)
*G05B 13/02* (2006.01)
*H02H 7/04* (2006.01)

(52) U.S. Cl.
CPC ............ *H02J 9/061* (2013.01); *G05B 13/021* (2013.01); *H02J 9/066* (2013.01); *H02H 7/04* (2013.01); *Y10T 307/615* (2015.04)

(58) Field of Classification Search
None
See application file for complete search history.

(56) References Cited

U.S. PATENT DOCUMENTS

| | | |
|---|---|---|
| 6,198,176 B1 | 3/2001 | Gillette |
| 7,566,990 B2 | 7/2009 | Loucks et al. |
| 7,569,949 B2 | 8/2009 | Lathrop et al. |
| 7,615,888 B2 | 11/2009 | Lathrop et al. |
| 7,635,967 B2 | 12/2009 | Loucks et al. |
| 7,723,863 B2 | 5/2010 | Johnson, Jr. et al. |
| 7,948,117 B2 | 5/2011 | Lathrop et al. |
| 2005/0278075 A1* | 12/2005 | Rasmussen ............... H02J 9/06 700/286 |
| 2008/0179967 A1 | 7/2008 | Lathrop et al. |
| 2013/0049476 A1 | 2/2013 | Lathrop |

FOREIGN PATENT DOCUMENTS

| | | |
|---|---|---|
| JP | S5911799 | 1/1984 |
| JP | 01318599 A | * 12/1989 |
| JP | H01318599 A | 12/1989 |

OTHER PUBLICATIONS

International Search Report dated Feb. 20, 2015 in related matter PCT/IB2014/065508.

* cited by examiner

*Primary Examiner* — Rexford Barnie
*Assistant Examiner* — Swarna N Chowdhuri
(74) *Attorney, Agent, or Firm* — Myers Bigel, P.A.

(57) ABSTRACT

A system for providing backup power to a facility includes a generator and a controller. The controller is configured to operate the generator until a condition is met, determine a load history that occurs while operating the generator until the condition is met, determine a cool-down time based on the determined load history, and run the generator to the point when the condition is met and in an unloaded condition for the cool-down time.

17 Claims, 6 Drawing Sheets

|     | Load Size % of full load | Cool Down Time |     |
| --- | --- | --- | --- |
|     | 0-10% | 30 seconds |     |
|     | 11-20% | 45 seconds |     |
|     | 21-30% | 60 seconds |     |
|     | 31-40% | 75 seconds |     |
| 504 → | 41-50% | (90 seconds) | — 506 |
|     | 51-60% | 105 seconds |     |
|     | 61-70% | 130 seconds |     |
|     | 71-80% | 200 seconds |     |
|     | 81-90% | 225 seconds |     |
|     | 91-100% | 240 seconds |     |

*FIG. 6*

| Load Size % of full load | Time Load Applied | | | | |
| --- | --- | --- | --- | --- | --- |
|  | <1 minute | 1-5 minutes | 5-10 minutes | >15 minutes | >15 minutes |
| 0-10% | 0 sec | 45 sec | 60 sec | 75 sec | 90 sec |
| 11-20% | 15 sec | 60 sec | 75 sec | 90 sec | 105 sec |
| 21-30% | 20 sec | 75 sec | 90 sec | 105 sec | 130 sec |
| 31-40% | 25 sec | 90 sec | 105 sec | 130 sec | 200 sec |
| 41-50% | 35 sec | 105 sec | 130 sec | 200 sec | 225 sec |
| 51-60% | 40 sec | 130 sec | 200 sec | 225 sec | 240 sec |
| 61-70% | 45 sec | 200 sec | 225 sec | 240 sec | 240 sec |
| 71-80% | 50 sec | 225 sec | 240 sec | 240 sec | 240 sec |
| 81-90% | 55 sec | 240 sec | 240 sec | 240 sec | 240 sec |
| 91-100% | 60 sec | 240 sec | 240 sec | 240 sec | 240 sec |
|  | | | Cool Down Time | | |

ACTIVE ENGINE COOL DOWN TIME DELAY FOR AUTOMATIC TRANSFER SWITCH CONTROLLERS

CROSS-REFERENCE TO RELATED APPLICATIONS

Concurrently filed herewith is patent application Method and Apparatus to Optimize Generator Start Delay and Runtime Following Outage, and patent application Method and Apparatus to Change Generator Start Delay and Runtime Following Outage, the disclosures of which are incorporated herein in their entirety.

BACKGROUND

The disclosure relates generally to power systems and methods that employ generators for backup power to a facility, and more particularly, to a system, method, and controller for cooling a backup generator after use.

Typically, electrical power is provided from a primary source (such as a utility or a "grid") to facilities that include residential, small business, and industrial environments. However, occasionally the electrical power is interrupted for reasons that may include weather damage to power lines and equipment, power plant shutdowns (scheduled or not), and other sorts of system failures such as cascading plant failures. Although the grid can be generally stable over time and may operate uninterrupted for months or more, the possibility of lost power from the primary source is nevertheless ever-present and can result in a range of hardships that extend from a inconvenience, to lost business, to life-threatening situations.

For instance, in a residential application, not only are the occupants inconvenienced, but if sump pumps, refrigerators, furnaces, and air conditioning units are not powered, this can lead to flooding in the basement, food spoilage, high temperatures within the residence during summer (e.g., stagnant hot temperatures), or dangerously low temperatures during the winter (e.g., for certain medical conditions, threat of burst water lines, risk of frostbite). A business as well, such as a restaurant, may experience food spoilage and customer dissatisfaction in the event of a power outage. In an industrial setting, if power is lost, a plant shutdown may occur that can lead to lost production and employee/equipment downtime, and some industrial facilities have a critical requirement for continuous power (such as certain plant processes, computer installations, and the like), such as a wastewater treatment plant in which a power loss can lead to overflowing tanks and untreated sewage discharge. Also, some facilities such as urgent care providers and hospitals rely on uninterrupted power to power life-supporting equipment. In many instances there is a legal requirement to provide uninterrupted, or minimally interrupted, power to the facility to avoid the repercussions that can occur if primary power is lost.

In some instances a battery backup is adequate to provide backup power. However, if no battery recharge capability is provided, then the battery can only provide backup until the batteries are depleted. Battery backup, as well, can be inconvenient to work and typically includes an inverter to generate AC power from the DC power of the battery. Such systems can therefore be costly, inconvenient, and may only provide a limited amount of backup capacity when primary power is lost.

As such, backup electrical generators are often provided that serve as a standby or secondary source in the event of primary power outage. The backup generator may be manually connected to loads within the facility when primary power is lost. Or, in many instances a backup system includes an automatic transfer switch (ATS) that detects power from the primary source, and when primary power is lost, the ATS controllably disconnects the primary source, powers up the standby generator, and engages the generator power with the loads. The ATS can work in reverse as well, so that when primary power is again online the ATS switches back to the primary and powers down the standby generator.

ATS' often have built-in time delays that are implemented during operation to ensure the least amount of interruption to the end user. In one example, there may be a time delay to allow automatic reclosers to occur before the ATS starts the generator, which protects against un-needed engine starts. Another example of a time delay is the time delay before transferring to the generator once the generator is running, which allows for proper engine warm-up before applying a load to it. And, another time delay is the time that the generator runs after it has been determined to shut down the generator and after the generator load has been removed (that is, to run in an unloaded state and cool the generator). ATS' typically have timers that are either hard coded and cannot be changed, dip switches that allow minimal choices in the time delay, or the time delay may be programmed in advance.

In one known design, a thermal sensor is used to detect when the generator has adequately cooled, and then shutdown occurs when the cooled temperature is reached. Thermal sensors, however, are prone to failure and add cost to the overall product, and may be located a distance from the generator itself (typically resulting in a long control line between the generator and the controller).

Thus, in a system with no thermal sensor, when the generator runs, whether due to 1) periodic running to exercise the generator/system, due to 2) a trigger that caused the generator to power up (such as a brief loss of primary power, but primary power is restored before loads are switched to the generator) or due to 3) an extended power outage, the timer counts down a predetermined amount of time to ensure that the engine is properly cooled. That is, regardless of the reason for generator operation or the duration and loads that have been placed on the generator, the unloaded runtime for the generator to allow cool down is the same. Such operation can lead to unnecessary extended runtimes, resulting in excessive fuel cost and needless engine wear.

Therefore, it is desirable to control the amount of engine cool down time to reduce fuel cost and reduce engine wear.

BRIEF DESCRIPTION

Exemplary illustrations of the disclosure are directed to a method and apparatus for reducing cool down time and engine wear in a generator.

A system for providing backup power to a facility includes a generator and a controller. The controller is configured to operate the generator until a condition is met, determine a load history that occurs while operating the generator until the condition is met, determine a cool-down time based on the determined load history, and run the generator to the point when the condition is met and in an unloaded condition for the cool-down time.

A method for providing backup power to a facility includes operating a generator until a primary power is restored to the facility, determining a load profile while operating the generator before the power was restored, determining a cool-down time based on the load profile, and running the generator to the point when the power is restored and in an unloaded condition for the cool-down time.

A computer-readable medium (also referred to as a processor-readable medium) includes any non-transitory (e.g., tangible) medium that participates in providing data (e.g., instructions) that may be read by a computing device (e.g., by a processor of a computer). Such a computer-readable medium may tangibly embody computer-executable instructions to implement at least a subset of operate a generator until a condition is met, determine a percentage load while operating the generator until the condition is met, determine a cool-down time based on the determined percentage, and run the generator past the point when the condition is met and in an unloaded condition for the cool-down time.

Various other aspects, features, and advantages of the present disclosure will be made apparent from the following detailed description and drawings.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

The present disclosure is directed to a method and an apparatus for reducing cool down time and engine wear in a generator. As can be readily appreciated, the temperature of a generator is dependent on a number of factors that include but are not limited to the amount of load applied to the generator, when loads are applied, and a temperature of the environment in which the generator is placed. For instance, a large load (for instance, approaching the full load condition of the generator) applied for a relatively long time may cause the generator to heat up, but if the generator subsequently experiences a light load, the generator may have cooled significantly after the heavy load is discontinued and before it is desired to shut down the generator. The rate of cooling of the generator will also likely be dependent on the temperature of the environment in which the generator is positioned. Thus, the rate of cooling may vary in winter versus in summer, as an example. Thus, the disclosed embodiments account for the load applied and the amount of time that has transpired since the load was applied. In one example the environmental temperature where the generator is positioned is accounted for as well.

Figure 1:
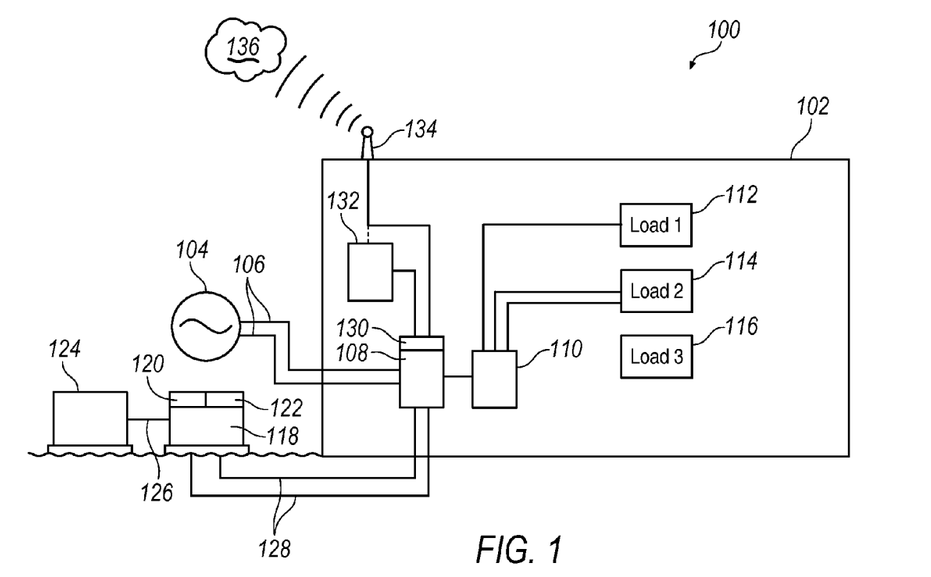
FIG. 1 illustrates a premise that may include a building having a generator for backup.

FIG. 1 shows premise 100 that includes a building 102 having electrical power fed thereto from a primary electrical energy source or an electrical source 104, such as an electrical grid, via power lines 106. Electrical power is fed via lines 106 to building 102 and to a transfer switch 108. Transfer switch 108 is electrically coupled to a load center 110, which is electrically coupled to electrical loads 112, 114, and 116. Loads 112-116 may include but are not limited to air conditioning, computers, lighting, refrigeration, life-support systems, and power ports for re-charging electrical devices, as examples.

A standby generator 118 is positioned on premise 100 and proximate building 102. Standby generators are often positioned outside of a building to provide an alternative or backup source of electrical power for facilities that rely on electrical power for preserving life, preserving perishable items, preventing accidents, preventing theft, and providing security, as examples. Often, a standby generator is designed or selected to provide backup power for a specific application, such as a residential, a commercial, or an industrial facility. For a residential application, it is typically desirable to provide backup power for freezers, air conditioning or heating, for lighting, or to recharge mobile devices and run a computer, as examples. Whereas in a commercial or industrial facility, backup power may be provided to keep the facility fully functional and with minimal downtime in the event or a power outage. In some instances it may be a legal requirement to include backup power (such as if a life-support system is being powered by the utility), as opposed to a "business requirement" (such as in a restaurant where it may be desired to keep operating and not inconvenience customers).

Generators may include air-cooled portable, air-cooled stationary, or liquid-cooled stationary units, the type of which is selected often on the size and convenience of use, the type of fuel (which may be based on fuel cost or availability, and may include gasoline, natural gas, liquid propane, diesel, or waste gas from a wastewater treatment plant digester [e.g., biofuel], as examples), or the type of backup power that is being provided for, as examples. A typical generator includes an engine 120 and a control panel 122, as well as an oil filter, fuel control, air intake, exhaust, and the like. According to one example, a fuel storage tank 124 may be situated proximate generator 118, which provides fuel via a fuel line 126.

When a power outage event occurs, standby generator 118 provides backup power to building 102. Before providing the backup power, the electrical components (i.e., loads 112-116) are taken "offline" to isolate the building electrically and prevent back-feeding power from generator 118 onto the utility. Isolation can be done either in a main breaker switch within load center 110, or via transfer switch 108. In one example, loads may be sensed via a current transformer. It is contemplated, however, that the generator in one example is prevented from back-feeding into the utility. In another example, a transfer switch may be used where the sources are paralleled. In this example the generator could backfeed (what is known as exporting power), which may be done in a wastewater treatment plant where the generator runs 24×7 paralleled with the utility and pumping excess generated power into the grid.

As shown, the generator and utility power meet at transfer switch 108 (lines 128 for the generator and lines 106 for the utility), and from there the power is routed to loads 112-116 via load center 110. Thus, it is contemplated that back-feeding to the utility may be prevented by way of an "open transition" design of transfer switch 108. That is, in an open transition design, either the utility or the generator is connected to the loads 112-116, but not both at the same time. It is contemplated, however, that a "closed transition" transfer switch, as well as an "in-phase" transfer switch may also be employed, according to the disclosure. In one illustrative approach a back-feed breaker is included in lieu of a transfer switch; it is contemplated, however, that other known solutions, typically mechanical in nature, interlock a main breaker and the back-feed breaker to ensure that the utility is not back fed to the generator. After isolation, generator 118 is run, and power is provided to building 102, and to loads such as loads 112-116.

In one example, generator 118 may have an air-cooled portable generator that is stored elsewhere when not in use. When a power outage occurs, an operator manually disconnects the main electrical power from the utility and connects the generator directly to electrical loads via extension cords (if no transfer switch 108 is present in the building). However, such operation can be inconvenient and time-consuming, and may require someone to physically move the generator, isolate from the utility, and connect to the loads. Such inconvenience may be reduced by providing transfer switch 108, which provides a convenient connection location for the generator to be interconnected to loads 112-116. However, in this example, transfer switch 108 is a manual transfer switch and also may require someone to physically move the generator and isolate from the utility. Such operation may also be semi-automatic in which one or more of the steps (operating the transfer switch, powering up the generator, etc. . . . ) are done manually but with the convenience of a pushbutton).

In another example generator 118 is a stationary unit (air or water cooled) that is permanently positioned next to building 102 and wired directly thereto, avoiding the need to connect to building 102 when an outage occurs. Such a system typically includes transfer switch 108 which may be a manual switch, but is more likely to be an automatic transfer switch (ATS) for providing automatic control of a variety of backup power system operations. In this example, power is conveyed from stationary generator 118 via power lines 128, which in one illustrative example are installed underground and semi-permanently. In one example, ATS 108 includes a programmable module 130 that allows input of control parameters, operational parameters, and the like. However, in another example (or in addition to module 130), a programmable computer system or controller 132 may be provided that is electrically coupled to ATS 108, and through which programmable control may be implemented.

Also, operation of module 130 and/or computer 132 may be via a hand-held device such as a "smart phone" in which and application or "app" may be used to control operation, program parameters, and the like. In one exemplary illustration, the smart phone may be in direct wireless communication with module 130 and/or computer 132, and in another example such control is via an external source 134. External source 134 may be an incoming cable box that provides internet access, may be a satellite hookup, may be a wireless server (Wi-Fi), or may be via "cloud computing" 136, as an example.

When transfer switch 108 is an automatic switch (ATS), and when a power outage occurs, ATS 108 operates to automatically power up generator 118 to provide power via lines 128, isolate the loads 112-116 from the utility (and no power therefore transfers along lines 106 that originates from the utility 104), and connect the loads 112-116 to the generator 118. According to one example, computer 132 detects power lost from electrical source 104, which may be via ATS 108.

Disconnection may be via a contactor, or other known switching devices, designed to perform load transfer between two AC sources, or may be via a molded case or power-case circuit breaker and without a trip unit. In the case of a contactor, an operating mechanism typically includes a solenoid and a mechanical interlock, and when the solenoid is energized it drives the moving contacts to transfer from one source to another (i.e., from the utility to the generator). For a molded case design, a circuit breaker may be provided without an overcurrent trip, and two separate power devices that may transfer by opening the first source and closing the second source (e.g., the utility and the generator representing the first source and the second source).

ATS 108 may be operated via a number of control parameters, that may include but are not limited to, which loads to power and which to bypass, how long to power the loads, how long the generator is run for cool down, and warnings if overheating, low fuel, and the like. ATS 108 may also continue to monitor for power from the utility and thus, when power is detected (i.e., the utility is again providing power), then ATS 108 may automatically return connectivity to the utility by disconnecting load from the generator, re-connecting to the utility, and shutting down the generator after a programmed cool-down delay. Operation of ATS 108 may therefore be controlled via a number of parameters that may be in module 130, computer 132, or remotely controlled or programmed via a wireless devices via, for instance, external source 134.

Figure 2:
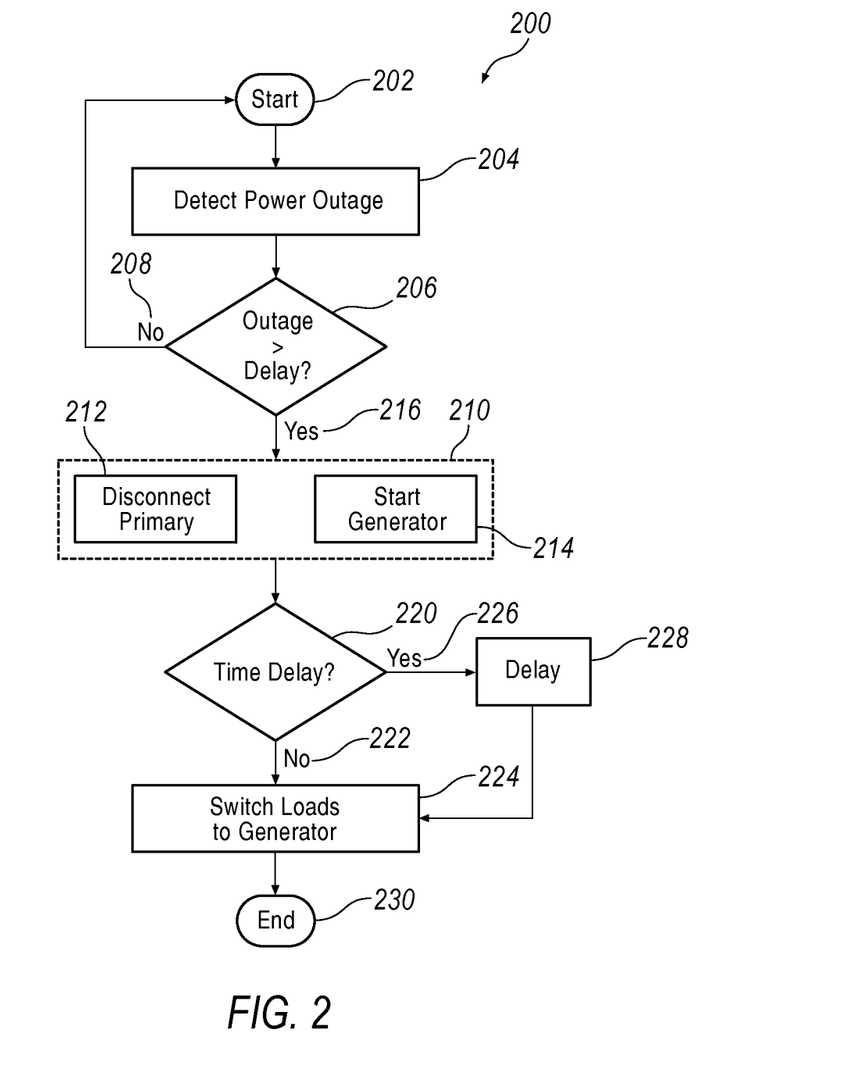
FIG. 2 illustrates an exemplary process flow for bringing a back-up generator online.

FIG. 2 illustrates an illustrative process flow 200 that includes steps for bringing a back-up generator online, according to one example. Flow 200 may be implemented in a controller, such as controller 132 of FIG. 1, or via a programmable module of a transfer switch, such as module 130 of switch 108, as examples. Starting at step 202, a power outage is detected at step 204. In the event that a detected disruption in power is a very short and anomalous event, it may be desirable to implement a time delay before taking steps to bring a back-up generator on line. Such a time delay may be on the order of less than a second, to as much as several seconds or more. Such delay is implemented to reduce the number of inadvertent generator startups, and reduce the number of operations of disconnection of the primary. Thus, at block 206, assessment is made whether a time delay is implemented. If an outage is greater than a nominal time delay 208, then steps 210 may be implemented, in which the primary is disconnected 212 (such as via a breaker box or via ATS 108) and the generator is started 214. If a time delay exceeded 208, then disconnecting the primary 212 and starting the generator 214 may occur after the desired time delay, disconnecting the primary 212 occurs after the generator starts. Once the primary is disconnected 212 and the generator is started 214, then a time delay may further be implemented at step 220 to ensure the generator is fully operational and also, as examples, assess whether the grid has returned to full power, allow adequate time for generator warm up, and allow stabilization of voltage and frequency outputs. Whether a delay is implemented 226 or not 222 (practically speaking, at least some delay is typically implemented), then loads are switched to the generator at step 224. However, if a delay is implemented 226, then at step 228 a time delay occurs before switching to the generator at step 224. The process ends at step 230.

As such, method 200 includes optional time delays, one or both of which may be implemented to reduce inadvertent activities in the event that the detected power outage is merely a short event that does not warrant switching to generator power. For instance, if an interruption is only a few seconds, it may be beneficial to "wait out" the disruption, as it typically takes a few seconds to several seconds (10-20 seconds) to initiate generator startup, disconnect the primary power source (i.e., utility), and switch over the loads to the generator, all while ensuring to avoid any back-feed of power to the power grid. Whether to use one or both time delays 206, 220 is dependent on system design, criticality of lost power for brief periods of time, and the like.

Figure 3:
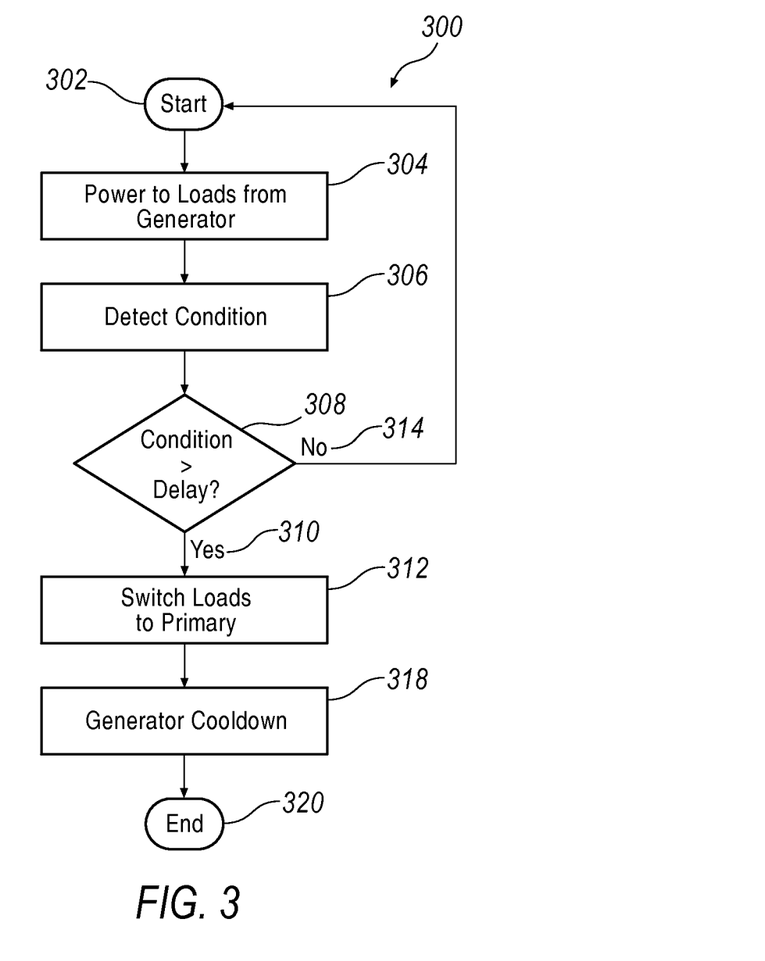
FIG. 3 illustrates an exemplary process flow reconnecting the load to the utility or primary power after generator use.

FIG. 3 illustrates a process flow 300 that includes steps for bringing the utility or primary power supply back online, shutting down the generator, and implementing a generator cool-down. Method 300 starts at step 302, during which time power is being provided to loads from the generator, step 304. When a condition is detected 306, method 300 is triggered to return to primary power and shut down the generator. Typically, the condition detected at step 306 is a voltage from the primary source, which may be detected by switch 108. That is, when power returns from the utility, a voltage is thereby detected and used as an indication that power has returned and the generator is no longer needed. However, the condition indicating power has returned may also be by a manual switch (in which power is known to have returned by an electrician or trained person using detecting equipment such as a volt meter), or by detection of current, or by other means such as a visual indicator that power has returned.

Similarly to generator startup as described with respect to FIG. 2, if, at block 308, the condition 306 is detected 310 for a period that is greater than a nominal delay period, then loads are switched to the primary power supply. That is, if the condition detected at step 306 is but for a brief period of time, and power has not returned in a stable condition, it may be desirable to implement a time delay of a several minutes to perhaps 30 minutes, as an example, to ensure that power from the utility has indeed returned. If the condition exceeds the delay period 310, then loads are switched to the primary or utility supply 312, such as from electrical source 104. Once the loads are switched at step 312, a generator cool-down is implemented at step 318, which typically is a fixed period of time such as 1-2 minutes or up to 5 or more minutes. After generator cool down 318, the process ends at step 320, at which point the generator is shut down and the loads are provided power from the utility.

The disclosed subject matter deals with a time delay for engine or generator cool down. When sensing the amount of load that the generator is carrying, coupled with the controller programmed with the size of the generator, the percentage of load that the generator is carrying is determined. Based on the percentage of load that the generator is carrying, the amount of engine cool down time can be calculated and achieved.

Figure 4:
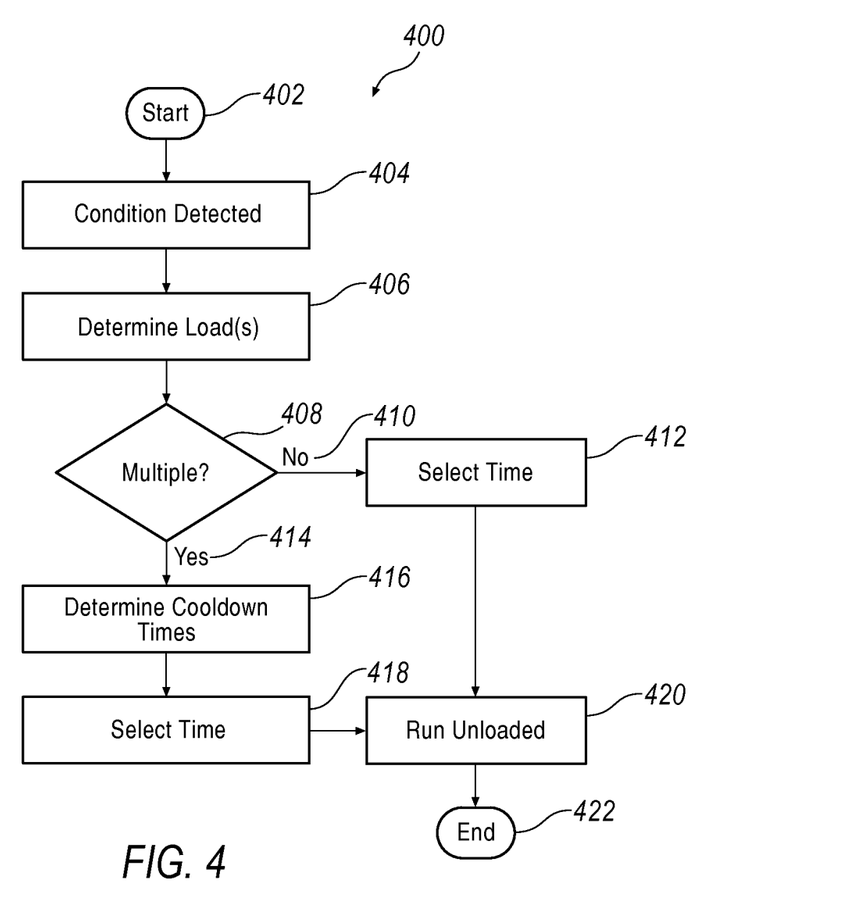
FIG. 4 illustrates an exemplary process flow for determining a cool down time for a generator.

Referring to FIG. 4, a method or process flow 400 for providing backup power for a facility is disclosed. The method 400 is applicable to a system, such as system 100, in which the operation of generator 118 is controlled by control panel 120, programmable module 130, and/or programmable computer system or controller 132, generally referred to as a "controller". Flow 400 is directed toward determining a cool down time for a generator that is based on an amount of load that the generator has experienced, and operating the generator for the cool down time after backup power is no longer needed.

Starting at step 402, in general the controller is configured at step 404 to operate the generator until a condition is met. That is, upon starting at step 402, it is assumed that generator 118 is operating in a backup mode for a facility, such as facility 100, and the power from the grid has been interrupted. During operation, the controller monitors the load condition, and changing conditions, that occur over time and leading up to a point when a condition is detected at step 404. In one example, a "percentage of total load" is determined by the controller that generally refers to percentage of the load, typically in kW, that a generator provides based on the overall generator maximum or rated maximum power. For instance, if a generator is rated at a maximum of 10 kW, and the total load is 3 kW, then its percentage of load is $\frac{3}{10} \times 100 = 30\%$.

Typically, the condition met or detected is the return of power from the main power supply or utility, detected by a return of voltage or current to lines 106 and utility 104 of FIG. 1. At step 406 the percentage of full load is determined, as will be further described. In one example, the percentage of full load is generally a constant value, leading up to the point when the condition is detected that indicates the return of power from the grid. However, in another example there are multiple loads that occur up to the point when the condition is detected. That is, as is commonly known, a load condition of a facility may include a number of loads that are periodically used. Lights are turned on and off, air conditioning or the furnace cycles, and refrigerators and freezers cycle, as examples. As such, load may vary over time—thus the percentage of full load of the generator also may vary over time leading up to the point when power is returned from the facility. Thus, having continually monitored generator usage and a load profile up to the point of power return from the grid, at step 408 the controller determines if multiple and changing loads have been experienced during the generator operation, to include a recent load profile (upon which the cool down time is determined) such as peak load, average load, and the like. If not 410, then a generally constant load profile may have been experienced and a time for cool down is selected at step 412 based on the percentage of total load of the generator. If multiple and changing loads are experienced 414, then cool down times are selected based on the different loads (which may be based on a peak load prior to the anticipated shutdown, as an example), and a cool down time is determined at step 416 based on the multiple and changing loads. A time is selected at step 418, as will be further shown. That is, a time is selected over which the relevant load profile is determined for the purpose of determining the cool down time. As such, method 400 includes cool down time selection at step 412 or at step 418, based on the determined percentage of full load. At step 420 the generator is run past the point when the condition is met and in an unloaded condition for the cool-down time. The method ends at step 422 when the generator has been cooled and is then shut down.

Figure 5A:
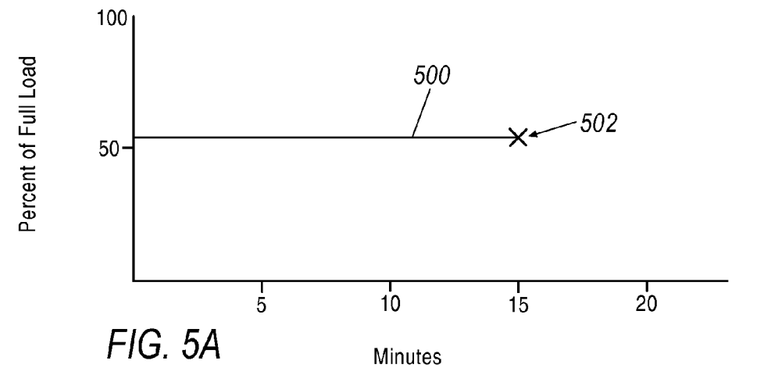
FIGS. 5A-5C illustrate exemplary load profiles of a generator.
Figure 5B:
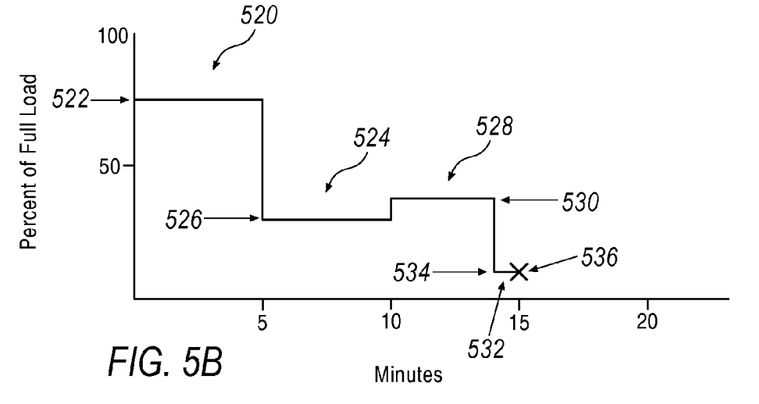
Figure 5C:
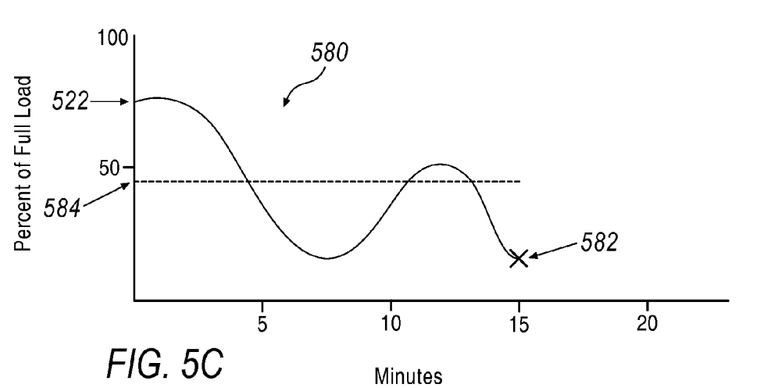
Figure 6:
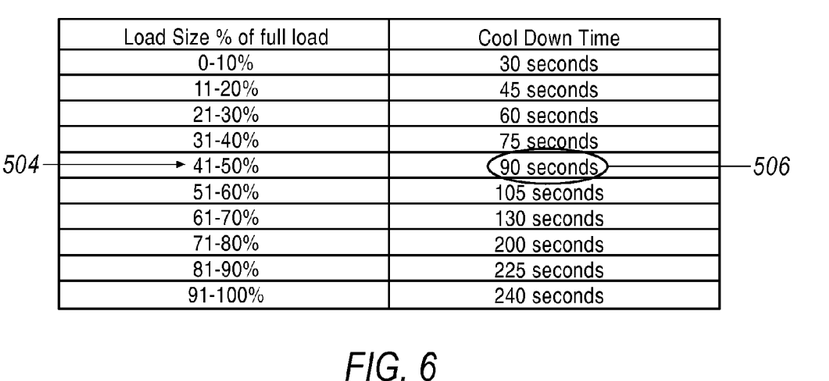
FIG. 6 shows an exemplary percentage of full load and a corresponding cool down time for a range of percentages.
Figure 7:
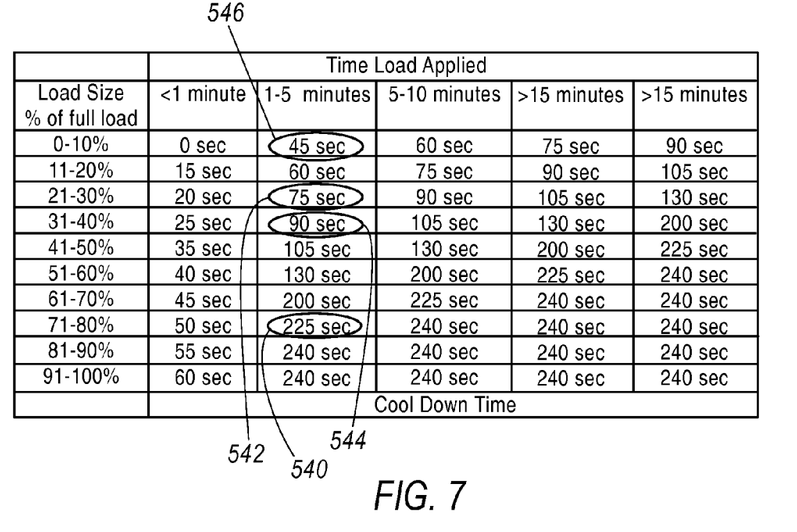
FIG. 7 shows exemplary percentages of full load for various times during which the load is applied, and corresponding cool down times.

Referring to FIGS. 5A-5C, various exemplary load histories or profiles are shown that may be used to determine the amount of cool down time for the generator, according to the disclosed subject matter, and based on percentages of full load. As will be further illustrated in FIGS. 6 and 7, the load profile is used to determine an amount of cool down time based on the load profile. FIG. 6 shows an exemplary percentage of full load and a corresponding cool down time for a range of percentages. FIG. 7 shows exemplary percentage of full load for various times during which the load is applied, and corresponding cool down times. It is to be understood that all such cool down times are merely exemplary, and the amount of cool down time is dependent on operating conditions (very hot desert environment, cool arctic environment, rainy and humid conditions, and the like) as well as the generator size and type (such as air cooled or water cooled, as examples). Thus, many factors are taken into consideration in determining the cool down times for the generator, FIGS. 6 and 7 being mere examples.

Likewise, load profiles in FIGS. 5A-5C are merely examples of generator operation, as well as the illustrated time of operation. For instance, FIGS. 5A-5C illustrate a 15 minute period that is used for the purpose of determining the cool down time. As can be appreciated, the 15 minute window illustrated is a rolling or moving window that represents the previous 15 minutes of generator operation. Thus, for the purposes of illustration a relevant 15 minute window is assumed, but it is contemplated that any prior window of operation can be used to determine the cool down time. That is, as can be understood, a generator may be run for extended periods of time, exceeding hours or more of operation in some instances. However, in one example and as shown it is only the last 15 minutes of operation that are determinative in selecting the cool down time of the generator. In other words, it is understood that regardless of how the generator was operated hours ago, it may be only the last period of operation, 15 minutes in this example, which is relevant to determining the cool down requirements.

Referring to the exemplary constant load of FIG. 5A, the generator has been operated at a steady load of approximately 55% 500 of full load until utility power is returned 502. That is, point 502 represents the point when a condition is met, such as the return of power from the main grid, after which it is desirable to shut down the generator after running the generator for a cool down period. The corresponding cool down time is determined from FIG. 6. Referring to FIG. 6, for the range of 41-50% 504, a corresponding cool down time is 60 seconds, seen at 506. Thus, for the exemplary relevant period of the last 15 minutes of generator operation, rather than needlessly operating the generator for an extended cool down time, the table of FIG. 6 indicates that a cool down of 90 seconds will be adequate, leading to reduced generator run time, saving fuel, wear on the generator, etc.

Figure 8:
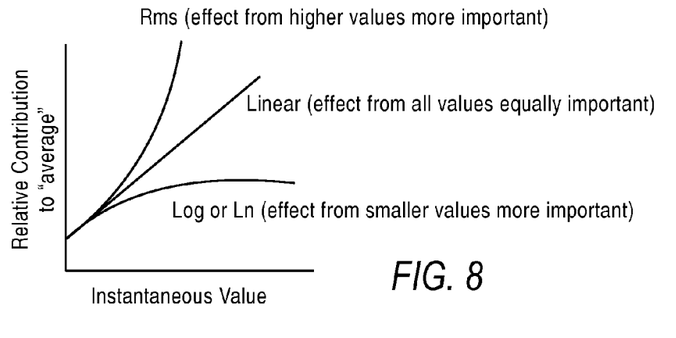
FIG. 8 shows modeling examples that may be implemented to augment calculations for a cool down time.

As another example, an exemplary load of FIG. 5B shows the previous 15 minutes of operation, which includes a first 5-minute period 520 at approximately 80% of full load 522, a second 5-minute period 524 at approximately 30% of full load 526, a 4-minute period 528 of approximately 40% of full load 530, and a last minute of operation 532 at approximately 10% of full load 534. As can be appreciated, in this scenario the changing load during the last 15 minute window will affect the operating temperature of the generator when point 536 occurs, the point when a condition is met, such as the return of power from the main grid, after which it is desirable to shut down the generator after running the generator for a cool down period. In one example, the average percentage of full load may be determined during the 15 minute window to be 48% (80×5+30×5+40×4+10×1)/15=720/15=48). Thus, in one example and referring again to FIG. 6, the average power, determined as 48%, falls again in the 41-50% range 504, corresponding again to 90 seconds of cool down time. However, using an average percentage is one exemplary method of calculating an equivalent heating value, and it is contemplated that other methods may be implemented as well. For instance, a root mean square (rms) method (where higher loads may disproportionately affect the calculated load) and log methods (where lower loads affect the calculated value more) may also be implemented. FIG. 8 illustrates a general trend of each exemplary response, representing therefore modeling examples that may be implemented to augment calculations for a cool down time.

In another illustrative example, the load profile of FIG. 5B may lead to a determined cool down time as defined in FIG. 7. That is, referring to FIG. 7, a "worst case" scenario may be used to determine what an optimal cool down time is. For instance, for period 520 at 80% of full load, FIG. 7 indicates at location 540 that a 225 second cool down time is desired. Correspondingly, period 524 suggests a cool down time of 75 seconds 542, period 528 suggests a cool down time of 90 seconds 544, and period 532 suggests a 45 second cool down time 546. Thus, based on the periods 520, 524, 528, and 532, a time of 225 seconds is selected for cool down, based on the most conservative assumption of the 5 minutes period at 80% load as dominating the cooling profile. Thus, the load profile in FIG. 5B may correspond to a cool down time period of 90 seconds, if determined based on FIG. 6 and as described above, or load profile 5B may correspond to a cool down time period of 225 seconds, if determined based on the illustration of FIG. 7.

As can be seen in FIG. 5B, the time used to determine the run time can result in different percentage loads, hence different run times for cool down. For instance, if using the previous example described with respect to FIG. 5B and using the full 15 minutes illustrated, as summarized above, the percentage load is 48%, resulting in 90 seconds of cool down time. However, if instead only the previous 10 minutes is used, then the corresponding load is determined to be 32% (30×5+40×4+10×1)/10=320/10=32). Thus, using the same example but a different time period for the basis of cool down runtime determination, then the percentage load is 32% in contrast to the previously determined 48%—despite having used the same runtime data. Referring to FIG. 6, a load size of 32% falls in the category of 31-40%, resulting in a 75 second cool down period. Thus, the cool down time is selected, in one example, based on the time of a previous load profile, as well. In other words, because generator cooling is a transient event, in some conditions (such as when it is quite cold outside and the generator cools quickly) a high load, such as the 80% load occurring at period 520 of FIG. 5B, can result in a "false positive", and cause needless and additional runtime on the generator. On the other hand, in the example calculations provided, whether a 32% load is calculated or a 48% load is calculated (based on the assumed window of 10 versus 15 minutes), as shown above and using the lookup table, the two calculated cool down runtimes are 75 seconds versus 90 seconds, respectively. Thus, in this example, even a "false positive" caused by assuming that the 80% load is relevant for cool down purposes, results in only a 15 second additional runtime.

Further, it is contemplated that such time for determining which time duration to use (10 minutes versus 15 minutes, in the above examples related to FIG. 5B) may be selected based on weather conditions or based on current temperature outside. For instance, if extremely cold external temperatures are experienced outside, then it can be surmised that cool down and transient responses to the operation of the generator occur quicker than in conditions where the external temperature is hot (such as in summer). As such, whether to select a 10 minute window, or a 15 minute window, as an example, may be determined based on the external temperature (e.g., when below freezing select a 10 minute window).

Or, default time window selection may occur based on the season of the year (e.g., in winter select a 10 minute window and in summer select a 15 minute window).

Referring to FIG. 5C, a variable load profile is illustrated, which corresponds to a generally continuous load of operation of the generator, which may be experienced in a situation in which many loads are cycling on and off, resulting in a generally non-discrete overall load profile 580 as shown. In this scenario and in one example, the load profile may be averaged over time by integrating the profile 580 over the 15 minute window, and point 582 represents the point when a condition is met, such as the return of power from the main grid, after which it is desirable to shut down the generator after running the generator for a cool down period. In this example, the average percentage of total load is approximately 47% 584, which may used in the table of FIG. 6 to determine a cool down time of 90 seconds, in this example. In one example, a polynomial representation of the value may be integrated. In one example, it may be the integral of the value squared, after which a square root is taken to calculate an rms value. In another example, the natural logarithm of the value may be integrated. In general, other algorithms may be considered, depending on the geometry, engine size/type/brand type of cooling (air, liquid), etc.

As such, the various examples for determining a cool down period are determined from the percentage load by sensing an amount of load over a given time period, and accounting for any change in load over the given time period. As the percentage load varies over various time increments and during a given time period (15 minutes in the above examples), a corresponding cool down time is determined. The percentage load for each time increment may be determined as an average over the given time period. The cool down time may be based in at least the illustrative example on a determined percentage and from a lookup table that includes cool down times as a function of percentage load; the cool down time is determined in one example based on a worst case determination using the load size applied over the given period of time and in some situations taking into account adjusting load sizes.

In general, computing systems and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above, or a NoSQL database such as MogoDB or Cassandra, as examples.

Thus, data from past events and operation of generators may be incorporated into above-disclosed operation to improve and fine tune generator operation.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for providing backup power to a facility, comprising:
   a generator; and
   a controller configured to:
      operate the generator until a condition is met;
      determine a load history that occurs while operating the generator until the condition is met;
      determine a cool-down time based on the load history that occurred during a moving window of time, wherein the moving window of time is defined as a fixed time period prior to when the condition is met, and wherein the cool-down time is based on an average power that occurred during the moving window of time; and
      run the generator to the point when the condition is met and in an unloaded condition for the cool-down time;
      wherein the load history determined includes a percentage of full load of the generator.

2. The system of claim 1, wherein the condition met is a detection of primary power from a main power supply.

3. The system of claim 1, wherein the controller is further configured to determine the percentage of full load by sensing an amount of load over a given time period that is the fixed time period, and accounting for any change in load over the given time period.

4. The system of claim 3, wherein the controller is configured to calculate the percentage load over various time increments during the given time period.

5. The system of claim 4, wherein the controller is configured to calculate the percentage load for each time increment, determine an average over the given time period, and determine the determined percentage as the average.

6. The system of claim 5, wherein the controller is configured to determine the cool-down time based on the calculated percentage and from a look up table that includes cool-down times as a function of percentage load, and determine the cool-down time based on a worst case calculation that is based on the time of load applied over the given period of time.

7. The system of claim 1, wherein the cool-down time is determined based on a temperature of an environment in which the generator is placed.

8. A method for providing backup power to a facility, comprising:
   operating a generator until a primary power is restored to the facility;
   determining a load profile while operating the generator before the power was restored;
   determining a cool-down time based on the load profile that occurred during a moving window of time that is for a fixed time period prior to when the power was restored, and based on an average power that occurred during the moving window of time;
   determining the average power as a percentage load of the load profile by sensing an amount of load over a given time period that defines the moving window of time, and accounting for any change in load over the given time period; and
   running the generator to the point when the power is restored and in an unloaded condition for the cool-down time.

9. The method of claim 8, further comprising configuring a controller to detect power lost from a primary energy source, start the generator, switch a load to the generator, and implement a time-delay before shutting down the generator.

10. The method of claim 8, wherein the load profile determined includes a percentage of full load of the generator.

11. The method of claim 8, further comprising calculating the percentage load over various time increments during the given time period, determining an average over the given time period, and determining the determined percentage as the average.

12. The method of claim 11, further comprising determining the cool-down time based on the determined percentage and from a look up table that includes cool-down times as a function of percentage load, and determining the cool-down time based on a worst case calculation that is based on the time of load applied over the given period of time.

13. The method of claim 8, further comprising determining the cool-down time based in part on a temperature of an environment in which the generator is placed.

14. The method of claim 8, further comprising determining the cool-down time based in part on a season of the year.

15. A non-transitory computer-readable medium tangibly embodying computer-executable instructions to:
   operate a generator until a condition is met;
   determine a percentage of full load while operating the generator until the condition is met;
   determine a cool-down time based on the percentage of full load during a moving window of time that is for a fixed time period prior to when the condition is met; and
   run the generator past the point when the condition is met and in an unloaded condition for the cool-down time; and
   calculate the percentage load over various time increments during the given time period, calculate the percentage load for each time increment, determine an average over the fixed time period, and determine the determined percentage as the average.

16. The computer-readable medium as claimed in claim 15, wherein the instructions further comprise a step to determine that the condition is met by detecting a primary power from a utility.

17. The computer-readable medium as claimed in claim 15, further comprising instructions to calculate the percentage load over various time increments during the given time period, determine the cool-down time based on the determined percentage and from a table, and determine the cool-down time based on a worst case calculation that is based on the time of load applied over the given period of time.

* * * * *